(12) United States Patent
Sasaki et al.

(10) Patent No.: US 7,760,075 B2
(45) Date of Patent: Jul. 20, 2010

(54) TRACEABILITY SYSTEM

(75) Inventors: Shigeru Sasaki, Tokyo (JP); Yuichi Kobayashi, Sagamihara (JP); Shuji Terada, Kawasaki (JP); Yoshifumi Sato, Yokohama (JP); Takeshi Nakatani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/359,458

(22) Filed: Jan. 26, 2009

(65) Prior Publication Data

US 2009/0160624 A1      Jun. 25, 2009

Related U.S. Application Data

(63) Continuation of application No. 12/123,171, filed on May 19, 2008, now Pat. No. 7,482,932, which is a continuation of application No. 11/645,565, filed on Dec. 27, 2006, now Pat. No. 7,397,374, which is a continuation of application No. 11/060,563, filed on Feb. 18, 2005, now Pat. No. 7,183,923.

(30) Foreign Application Priority Data

Feb. 20, 2004      (JP) .............................. 2004-043831

(51) Int. Cl.
*G08B 13/14* (2006.01)

(52) U.S. Cl. .............. 340/10.42; 340/572.1; 340/572.4; 340/5.92

(58) Field of Classification Search .............. 340/10.42, 340/572.1, 572.4, 5.92, 10.1, 10.51, 505; 235/385, 383, 384, 492, 375, 376; 700/226; 705/28

See application file for complete search history.

(56) References Cited

U.S. PATENT DOCUMENTS

| | | | |
|---|---|---|---|
| 6,148,249 A * | 11/2000 | Newman | ..................... 700/225 |
| 6,600,418 B2 | 7/2003 | Francis et al. | |
| 7,036,729 B2 | 5/2006 | Chung | |
| 7,161,489 B2 | 1/2007 | Sullivan et al. | |
| 7,378,967 B2 | 5/2008 | Sullivan et al. | |
| 2004/0206810 A1 | 10/2004 | Yamagiwa | |
| 2006/0192003 A1 | 8/2006 | Chung | |

FOREIGN PATENT DOCUMENTS

| | | |
|---|---|---|
| JP | 2000-233808 | 8/2000 |
| WO | WO 99/50761 | 10/1999 |
| WO | WO 02/067063 | 8/2002 |

OTHER PUBLICATIONS

Traceability in the Food Chain, Mar. 2002, Food Chain Strategy Division, Food Standards Agency, pp. 1-51.
Foodtrace Concerned Action Programme Generic Framework for Traceability, May 8, 2002, Foodtrace Framework, pp. 1-21.

* cited by examiner

*Primary Examiner*—Toan N Pham
(74) *Attorney, Agent, or Firm*—Antonelli, Terry, Stout & Kraus, LLP.

(57) ABSTRACT

An individual article management arrangements for managing an individual article distributed through a plurality of sites with a form thereof changed at least one of said plurality of sites, including: information processing apparatuses installed at said plurality of sites; and a data center apparatus connected to each of said information processing apparatuses through a network. The data center apparatus and the information processing apparatuses are configured to effect predetermined operations.

18 Claims, 12 Drawing Sheets

| MONO ID | DATE AND TIME | SITE NAME | SHIPMENT DESTINATION | PROCESS |
|---|---|---|---|---|
| 501 | 04/15 09:00 | PROCESSOR B | WHOLESALER C | SHIPMENT |
| 502 | 04/15 09:00 | PROCESSOR B | WHOLESALER C | SHIPMENT |

22c

| POST-ASSORTMENT MONO ID | PRE-ASSORTMENT MONO ID | DATE AND TIME | SITE NAME | PROCESS |
|---|---|---|---|---|
| 310 | 501 | 04/15 10:00 | WHOLESALER C | ASSORTMENT |

22a

| MONO ID | DATE AND TIME | SITE NAME | SHIPMENT DESTINATION | PROCESS |
|---|---|---|---|---|
| 310 | 04/15 11:00 | WHOLESALER C | RETAILER D | SHIPMENT |
| 502 | 04/15 12:00 | WHOLESALER C | RETAILER A | SHIPMENT |

FIG. 8

| PROCESS ID | MONO ID | DATE AND TIME | SITE NAME | PROCESS |
|---|---|---|---|---|
| 123456-01 | 501 | 04/15 09:00 | PROCESSOR B | SHIPMENT |
| 123456-02 | 502 | 04/15 09:00 | PROCESSOR B | SHIPMENT |
| 123456-03 | 501 | | WHOLESALER C | RETAILER |
| 123456-04 | 502 | | WHOLESALER C | RETAILER |
| 123456-05 | 501 | 04/15 10:00 | WHOLESALER C | ASSORTMENT |
| 123456-06 | 310 | 04/15 10:00 | WHOLESALER C | ASSORTMENT |
| 123456-07 | 310 | 04/15 11:00 | WHOLESALER C | SHIPMENT |
| 123456-08 | 310 | | RETAILER D | RETAILER |
| 123456-09 | 502 | 04/15 12:00 | WHOLESALER C | SHIPMENT |
| 123456-10 | 502 | | RETAILER A | RETAILER |

FIG. 9

| BEFORE | AFTER |
|---|---|
| 123456-01 | 123456-03 |
| 123456-03 | 123456-05 |
| 123456-05 | 123456-06 |
| 123456-06 | 123456-07 |
| 123456-07 | 123456-08 |

FIG. 14

| INDIVIDUAL ARTICLE ID | LEVEL | EXAMINATION DATE | EXAMINATION RESULT | SHIPMENT DATE |
|---|---|---|---|---|
| 001 | RANK 1 | JANUARY 1, 00 | GOOD | JANUARY 3, 00 |

| INDIVIDUAL ARTICLE ID | LEVEL | EXAMINATION DATE | EXAMINATION RESULT | SHIPMENT DATE | PROCESSING DESCRIPTION | PROCESSING DATE |
|---|---|---|---|---|---|---|
| 001 | RANK 1 | JANUARY 1, 00 | GOOD | JANUARY 3, 00 | - | - |
| 003 | SECOND CLASS | FEBRUARY 1, 00 | ○ | FEBRUARY 3, 00 | DRESSING | JANUARY 15, 00 |

TRACEABILITY SYSTEM

CROSS REFERENCE TO RELATED APPLICATION

This is a continuation of U.S. application Ser. No. 12/123,171, filed May 19, 2008, now U.S. Pat. No. 7,482,932 which is a continuation of U.S. application Ser. No. 11/645,565, filed Dec. 27, 2006 (now U.S. Pat. No. 7,397,374), which is a continuation of U.S. application Ser. No. 11/060,563, filed Feb. 18, 2005 (now U.S. Pat. No. 7,183,923). This application relates to and claims priority from Japanese Patent Application No. 2004-043831, filed on Feb. 20, 2004. The entirety of the contents and subject matter of all of the above is incorporated herein by reference.

BACKGROUND OF THE INVENTION

The present invention relates to a technique for realizing traceability of individual articles cutting across a plurality of enterprises.

As a technique for managing and grasping distribution situations of individual articles, the technique disclosed in JP-A-2000-233808 has been known. In the document, IDs are assigned to individual articles, the IDs are read at each site, and information thereof is managed collectively, whereby individual articles can be traced. By writing the ID in an RFID tag, articles can be traced on an individual basis even if they are packed in boxes or the like.

SUMMARY OF THE INVENTION

In the document, although IDs are assigned to individual articles, they can no longer be traced if they are processed in an enterprise and their IDs are changed.

IDs are assigned to individual articles, and information of movement of individual articles across enterprises is collectively managed. If the ID is changed in an enterprise, information for relating the pre- and post-change IDs to each other is managed. Particularly, information processing is carried out to cope with a change in form of individual articles.

The present invention includes use of tags attached to individual articles for coping with a change in form of individual articles. The tags include rewritable IC tags and read-only IC tags. Moreover, the present invention includes assimilating a difference between ID systems used by (computer systems used by) parties involved in distribution. It includes, for example, exchanging information at a center apparatus connected via a network to the computer system of each party involved in distribution. This can be equally applied to the case where data formats of tags are different. The present invention includes assimilating a difference between tags used by parties involved in distribution is assimilated. If read-only tags and rewritable tags coexist, for example, rewritable tags are subjected to processing same as that for read-only tags. That is, control for prohibition of writing is performed.

The present invention includes storing unique IDs for identifying tags themselves in tags capable of storing information.

The present invention includes providing an output indicating that attached tags should be changed to computers installed at sites if divergence/integration of individual articles is detected. If the individual article is diverged into two articles, for example, display indicating that one or two new tags should be attached is output to a screen. If two individual articles are integrated into one article, an output indicating that one tag should be discarded is provided. If individual articles are integrated, a flag may be set in the center apparatus with one tag as being active (i.e. for use in subsequent distribution processes). In this case, the present invention includes making the non-active tag active if divergence is detected for the tag.

BRIEF DESCRIPTION OF THE DRAWINGS

FIG. 7 shows one example of process history data created at sites if the ID of a trace object is changed and the date and time across sites is not correct when the present invention is applied to the meat industry;

FIG. 8 shows one example of process history data which is managed at a traceability data center when the present invention is applied to the meat industry;

FIG. 9 is one example of index data which is managed at the traceability data center when the present invention is applied to the meat industry;

FIG. 14 shows individual article information A; and

FIG. 15 shows traceability information.

DESCRIPTION OF THE EMBODIMENTS

Embodiments of the present invention will be described in detail below.

Trace-back which is realized by implementing the present invention refers to knowing locations and times at which an object existed on its way, and locations and times at which components of the object existed on their way. Trace-forward which is realized by implementing the present invention refers to knowing locations and times at which the object existed on its way and a location at which the object currently exists, and locations and times at which a product obtained by processing the object existed on its way and a location at which the product currently exists.

Objects which are traced by implementing the present invention include foods, medical products, apparel products, electronic devices, parts and raw materials, which may be packed. Packed boxes and the like may also be objects to be traced. Locations that are traced are called sites. The site is, for example, a production plant, processing plant, distribution center, wholesale center, retail store or consumer, and may be, for example, a plurality of branches of the wholesale center. A data carrier such as a barcode or RFID having UCC/EAN-128, a slip number and an arbitrary number (hereinafter referred to as ID) written therein is attached or related to the trace object. The ID of the trace object may be changed as a result of integrating the trace object with one or more other trace objects at a processing plant or the like, dividing the trace object into two or more trace objects, packing one or more trace objects in one box and shipping the same, or taking out one or more trace objects from a received box.

Figure 1:
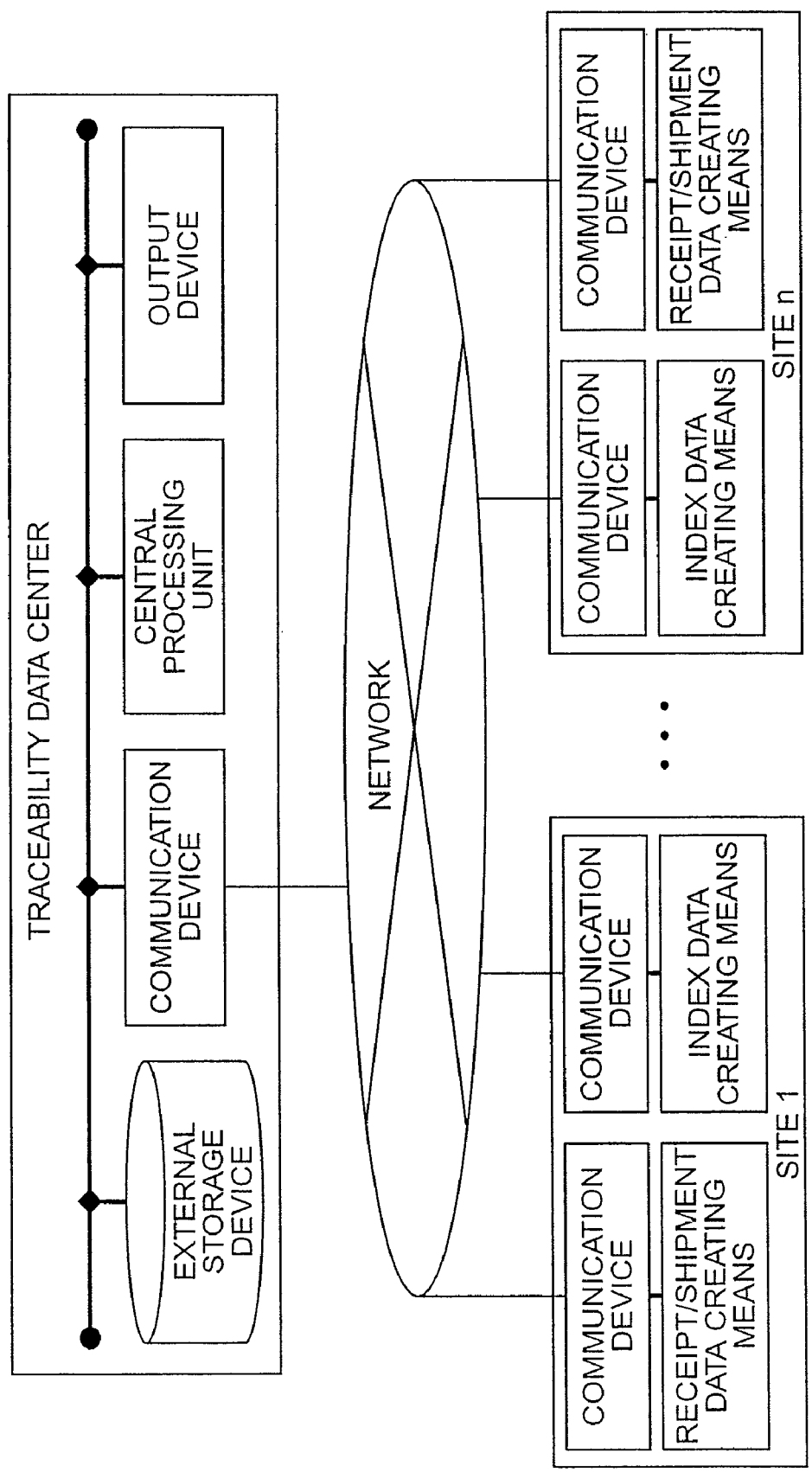
FIG. 1 is a block diagram of an inter-business traceability system.
Figure 2:
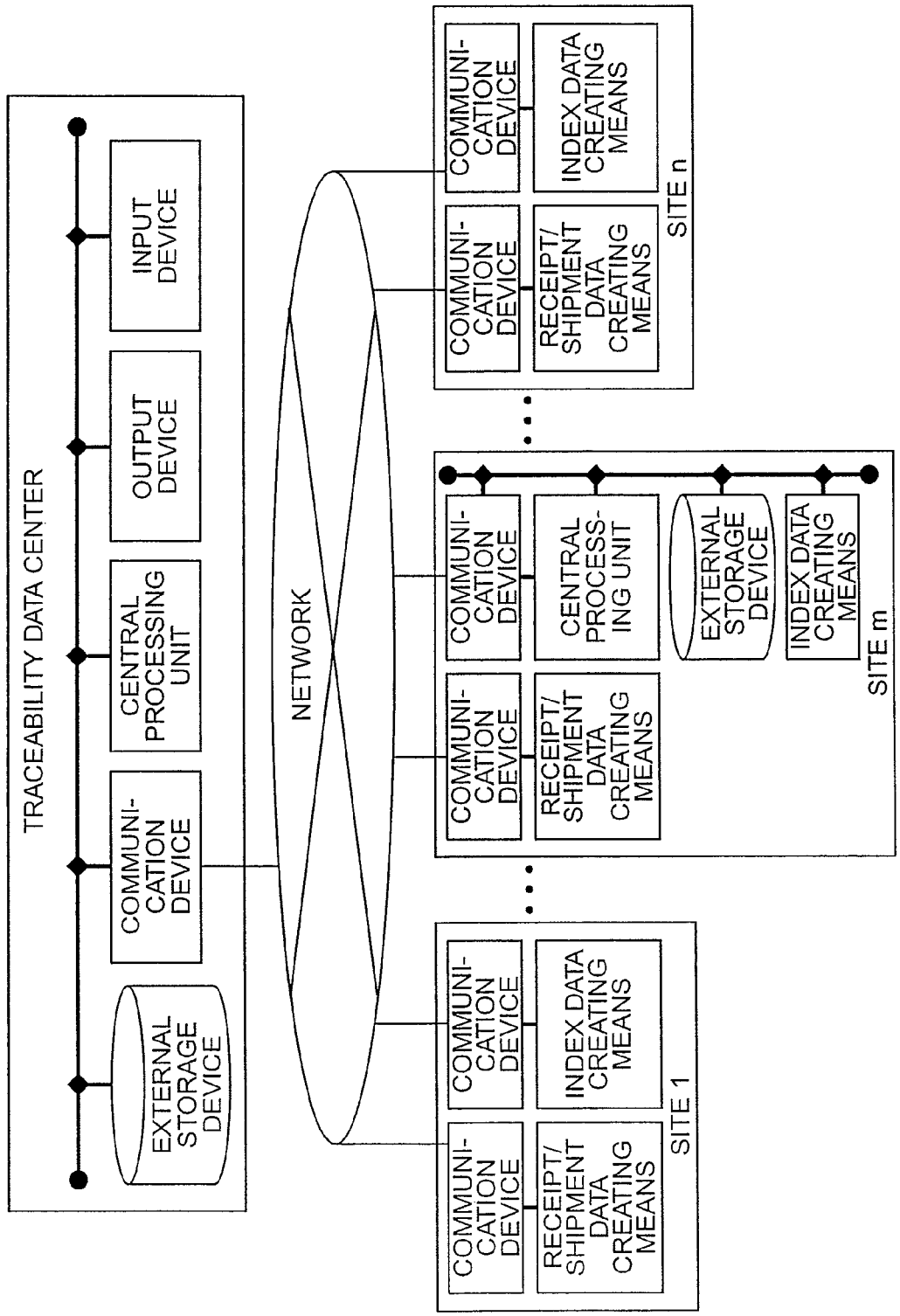
FIG. 2 is a block diagram of the inter-business traceability system of the present invention.

One example of the configuration of an inter-business traceability system of the present invention is shown in FIGS. 1 and 2. The inter-business traceability system comprises a traceability data center, one or more sites, and networks such as a telephone line, a LAN and a dedicated line. The traceability data center collects information required for traceability from the site and outputs trace-back information and trace-forward information, and comprises an external storage device such as a hard disk, communication devices such as a modem, a router and a terminal adapter, a central processing unit such as a CPU, and output devices such as a display, a printer, a FAX and an electronic data output, and may comprise input devices such as a keyboard, a mouse and a scanner as shown in FIG. 2. The site i ($1 \leq i \leq n$) manages individual articles of the trace object during receipt/shipment and processing, and comprises communication devices such as a modem, a router, a terminal adapter and a FAX, receipt/shipment data creating means and index data creating means, and may comprise an external storage device such as a hard disk and a central processing unit such as a CPU like the site shown in FIG. 2. The traceability data center and the site i ($1 \leq i \leq n$) are connected to each other using the communication devices.

The receipt/shipment data creating means reads the ID written in the barcode or RFID attached to the trace object by a reader when the trace object is received at and is shipped from the site, creates receipt/shipment data, and sends the receipt/shipment data to the traceability data center via the communication device. Alternatively, the receipt/shipment data creating means may connect to a receipt/shipment managing system such as a WMS or ERP system, create receipt/shipment data from information when the trace object of the site is received at and shipped from the site, and send the receipt/shipment data to the traceability data center via the communication device.

The receipt/shipment data is data indicating when and from which site to which site the trace object was received or shipped, and has information including IDs for identifying individual articles, the date and time of receipt or shipment, the site name, the name of the receipt/shipment destination, and the name of a process for distinguishing between receipt and shipment.

The index data creating means reads IDs written in barcodes or RFIDs attached to the pre-change and post-change trace objects by a reader when the ID is changed as a result of processing or packing the trace object in the site, creates index data, and sends the index data to the traceability data center via the communication device. Alternatively, the index data creating means may connect to a production managing system such as a WMS, MES or BOM system, create index data from information when the ID of the trace object is changed in the site, and send the index data to the traceability data center via the communication device. Alternatively, as in the site m shown in FIG. 2, the index data creating means may connect to the production managing system such as a WMS, MES or BOM system, create index data from information when the ID of the trace object is changed in the site m, store the index data in the external storage device of the site m, and send the index data to the traceability data center via the communication device upon request from outside. The index data is data indicating the relation of the ID before a process of the trace object in the site such as processing or packing with the ID after the process, and has information including the ID before the process, the ID after the process, and the names of processes such as processing, integration, division, packing and unpacking.

When the trace object is received at the site, the receipt/shipment data creating means reads the ID of the trace object, adds thereto the receipt/shipment date and time, the site name, the name of the receipt/shipment destination and the name of the process to create receipt/shipment data, and sends the receipt/shipment data to the traceability data center via the communication device. The central processing unit of the traceability data center stores the receipt/shipment data in the external storage device. In the site, the index data creating means reads the ID before the trace object is processed, reads the ID after the processing of the trace object, adds the name of the process to the IDs before and after the processing, and sends them to the traceability data center via the communication device. The central processing unit of the traceability data center stores the index data in the external storage device. When the trace object is shipped from the site, the receipt/shipment data creating means reads the ID of the trace object, adds thereto the receipt/shipment date and time, the site name, the name of the receipt/shipment destination and the name of the process to create receipt/shipment data, and sends the receipt/shipment data to the traceability data center via the communication device. The central processing unit of the traceability data center stores the index data in the external storage device. The central processing unit of the traceability data center reads the receipt/shipment data and index data stored in the external storage device, and links thereto related data, whereby trace-back information and trace-forward information of the trace object can be output via the output device.

For means for sending receipt/shipment data and index data from the site to the traceability data center, data may be sent directly, input using a Web browser, stored in a file format and sent in a file, or sent through FAX. In the case of sending data through FAX and the like, receipt/shipment data and index data created at the site may be input from the input device of the traceability data center as shown in FIG. 2. For timing of sending receipt/shipment data and index data from the site to the traceability, the data may be sent immediately after the data is created, at fixed intervals, or when the data is accumulated in a fixed amount. As shown in the site m in FIG. 2, the created index data may be stored in the external storage device of the site m, and not sent unless the send of the data is requested by the traceability data center. The central processing unit of the traceability data center reads the index data from the external storage device of the traceability data center, the external storage device of the site or both, and creates and outputs trace-back or trace-forward information. When the central processing unit of the traceability data center reads the index data from the external storage device of the site, the read index data is stored in the external storage device of the traceability data center, and the index data may be read from the external storage device of the traceability data center for second and subsequent times, or a period over which the index data is stored in the external storage device of the traceability data center is set, and the index data stored in the external storage device of the traceability data center may be deleted after expiration of the period.

Figure 3:
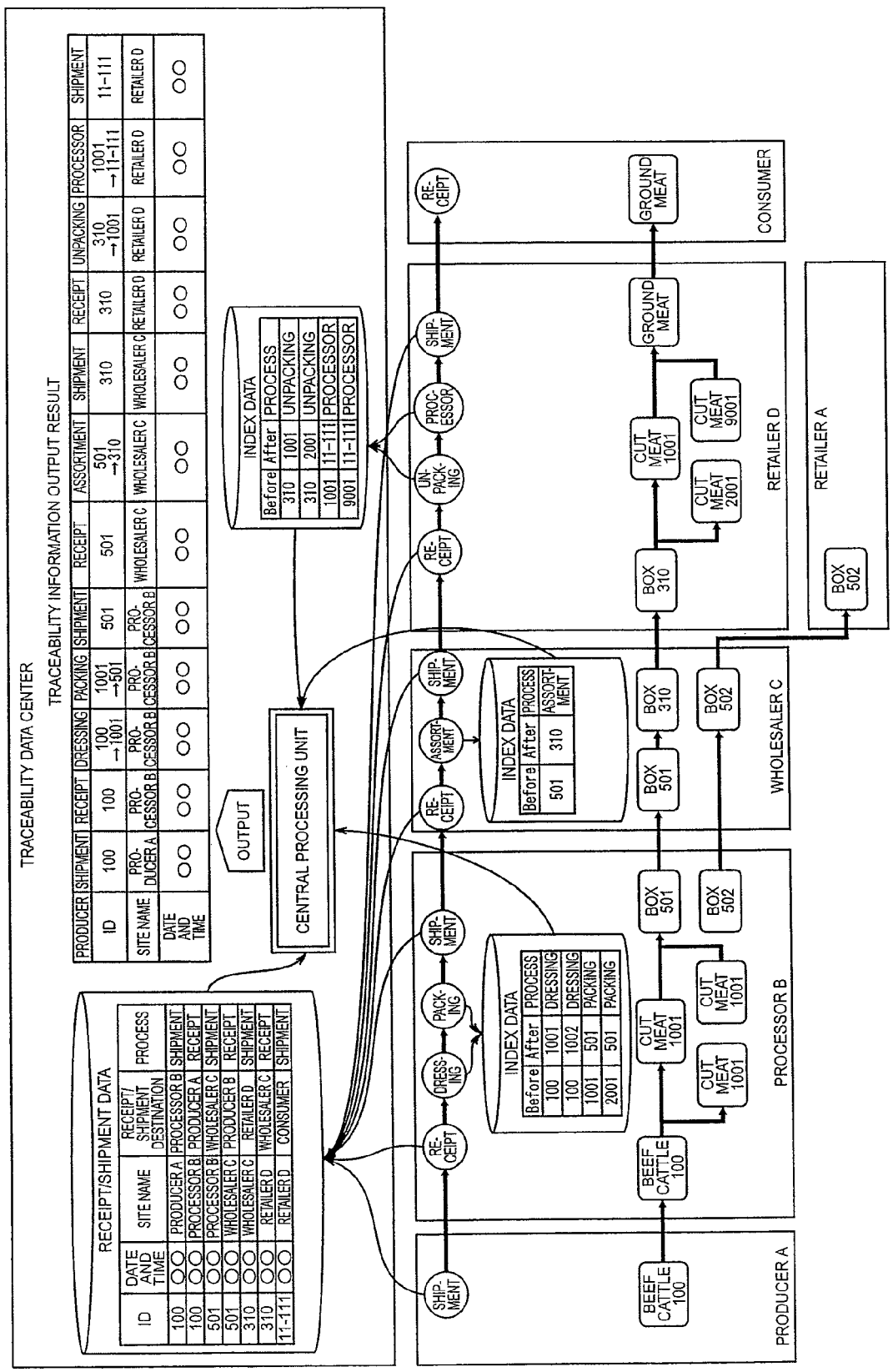
FIG. 3 shows an embodiment when the present invention is applied to the meat industry.

In this example, an embodiment for implementing the present invention will be described where the ID related to the trace object is not fixed, but changed through a production or distribution process. In this example, as shown in FIG. 3, the trace object is a meat, and the sites are a plurality of producers (A, B, C, D) feeding beef cattle, a plurality of processors (A, B, C, D) dressing beef cattle into cut meats, a plurality of wholesalers (A, B, C, D) assorting cut meats for retailers, a plurality of retailers (A, B, C, D) processing a plurality of cut meats together into ground meats, and many and unspecified consumers consuming ground meats. At the producer A, beef cattle having attached thereto a tag with the ID of 100 is shipped to the processor B. At the processor B, the beef cattle with the ID of 100 is received from the producer A, and dressed to produce two cut meats, tags with IDs of 1001 and 1002 are attached to the cut meats, respectively, the cut meat with the ID of 1001 and the cut meat with the ID of 1002 are packed in a box having attached thereto a tag with the ID of 501, and the box with the ID of 501 is shipped to the wholesaler C. At the wholesaler C, the box with the ID of 501 is received from the processor B, a tag with the ID of 310 is attached to the box with the ID of 501 for the purpose of assortment, and the box with the ID of 301 is shipped to the retailer D. At the retailer D, the box with the ID of 310 is received from the wholesaler C, the two cut meats having attached thereto the tags with IDs of 1001 and 1002 are taken out from the box with the ID of 310, the cut meat with the ID of 1001 and the cut meat with the ID of 9001 are processed together to produce one ground meat, a tag with the ID of 11-111 is attached to the ground meat, and the ground meat with the ID of 11-111 is shipped to the consumer. The consumer receives the ground meat with the ID of 11-111 from the retailer D.

Figure 4:
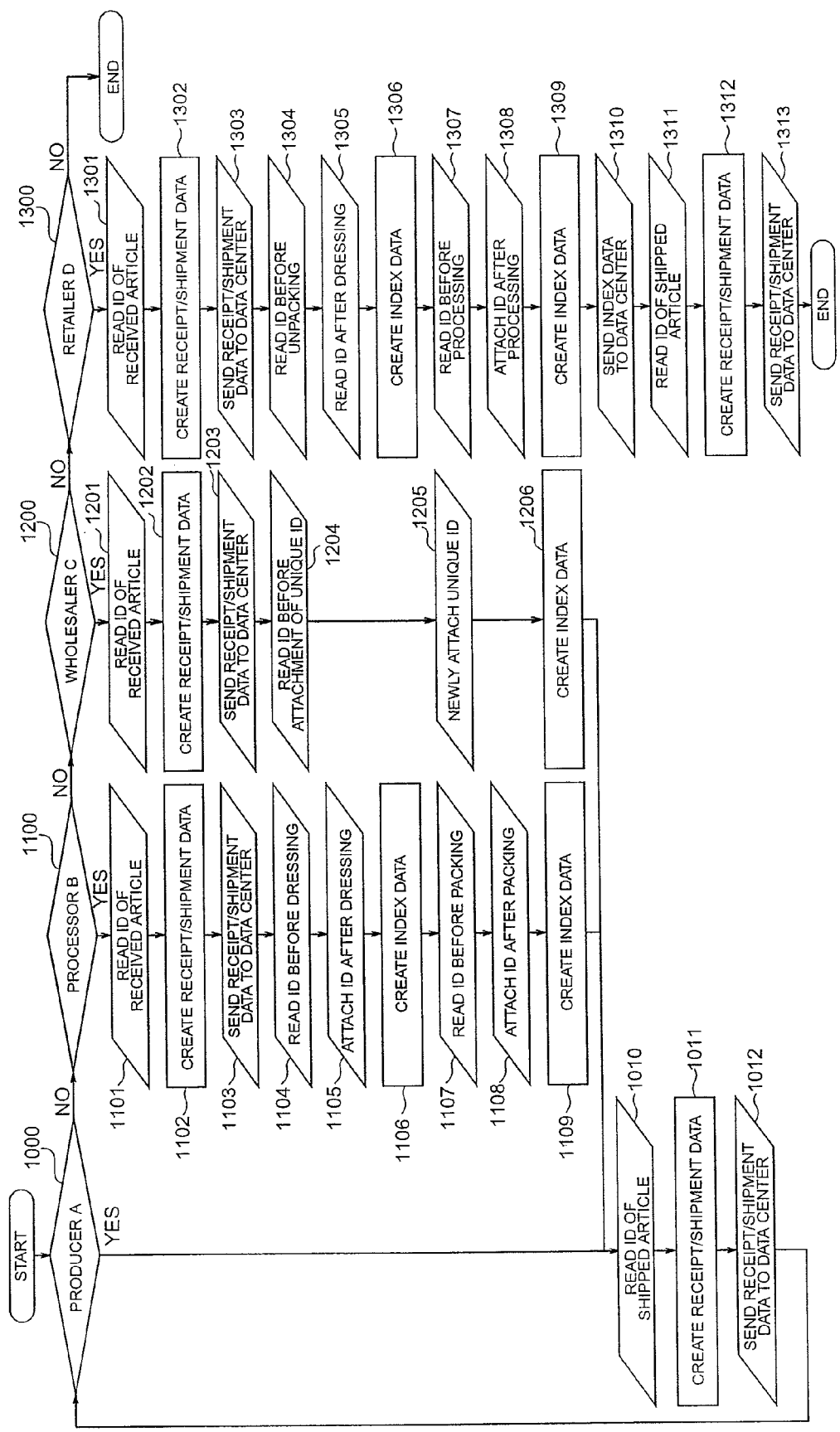
FIG. 4 is a flowchart showing a flow of a process for collecting data when the present invention is applied to the meat industry.

A flow of a process of receipt/shipment data creating means and index data creating means at sites of the producer A, the processor B, the wholesaler C and the retailer D is shown in FIG. 4.

The tracing of the beef cattle with the ID of 100 is started from the producer A (step 1000). The receipt/shipment data creating means of the producer A reads the ID of the beef cattle being a shipped article (step 1010).

The receipt/shipment data creating means of the producer A creates receipt/shipment data with the number 100 input for the ID, a shipment date and time input for the date and time, the producer A input for the site name, the processor B input for the receipt/shipment destination and shipment input for the process (step 1011).

The receipt/shipment data creating means of the producer A sends the created receipt/shipment data to the traceability data center. The central processing unit of the traceability data center stores the received receipt/shipment data in the external storage device (step 1012).

The beef cattle with the ID of 100 is received at the processor B (step 1100).

The receipt/shipment data creating means of the processor B reads the ID of the beef cattle being a received article (step 1101).

The receipt/shipment data creating means of the processor B creates receipt/shipment data with the number 100 input for the ID, a shipment date and time input for the date and time, the processor B input for the site name, the producer A input for the receipt/shipment destination and receipt input for the process (step 1102).

The receipt/shipment data creating means of the processor B sends the created receipt/shipment data to the traceability data center. The central processing unit of the traceability data center stores the received receipt/shipment data in the external storage device (step 1103).

The index data creating means of the processor B reads the ID of the beef cattle before the beef cattle is dressed (step 1104).

The index data creating means of the processor B attaches tags with IDs of 1001 and 1002 to two cut meats obtained by dressing the beef cattle (step 1105).

The index data creating means of the processor B creates index data with the number 100 input for the pre-dressing ID (Before), the numbers 1001 and 1002 input for the post-dressing ID (After), and dressing input for the process, and stores the index data in the external storage device of the processor B (step 1106).

The index data creating means of the processor B reads IDs of the two cut meats with IDs of 1001 and 2001 before the cut meats are packed (step 1107).

The index data creating means of the processor B attaches a tag with the ID of 501 to a box packed with the two cut meats (step 1108).

The index data creating means of the processor B creates index data with numbers 1001 and 2001 input for the pre-packing ID (Before), the number 501 input for the post-packing ID (After), and packing input for the process, and stores the index data in the external storage device of the processor B (step 1109).

The receipt/shipment data creating means of the processor B reads the ID of the box being a shipped article (step 1010).

The receipt/shipment data creating means of the processor B creates receipt/shipment data with the number 501 input for the ID, a shipment date and time input for the date and time, the processor B input for the site name, the wholesaler C input for the receipt/shipment destination, and shipment input for the process (step 1011).

The receipt/shipment data creating means of the processor B sends the created receipt/shipment data to the traceability data center. The central processing unit of the traceability data center stores the received receipt/shipment data in the external storage device (step 1012).

The box with the ID of 501 is received at the wholesaler C (step 1200).

The receipt/shipment data creating means of the wholesaler C reads the ID of the box being a received article (step 1201).

The receipt/shipment data creating means of the wholesaler C creates receipt/shipment data with the number 501 input for the ID, a receipt date and time input for the date and time, the wholesaler C input for the site name, the processor B input for the receipt/shipment destination, and receipt input for the process (step 1202).

The receipt/shipment data creating means of the wholesaler C sends the created receipt/shipment data to the traceability data center. The central processing unit of the traceability data center stores the received receipt/shipment data in the external storage device (step 1203).

The index data creating means of the wholesaler C reads the ID of the box before another tag for assortment is attached (step 1204).

The index data creating means of the wholesaler C attaches a tag with an ID to the box for assortment (step 1205).

The index data creating means of the wholesaler C creates index data with the number 501 input for the preceding ID (Before), the number 310 input for the subsequent ID (After), and assortment input for the process, and stores the index data in the external storage device of the wholesaler C (step 1206).

The receipt/shipment data creating means of the wholesaler C reads the ID of the box being a shipped article (step 1010).

The receipt/shipment data creating means of the wholesaler C creates receipt/shipment data with the number 310 input for the ID, a shipment date and time input for the date and time, the wholesaler C input for the site name, the retailer D input for receipt/shipment destination, and shipment input for the process (step 1011).

The receipt/shipment data creating means of the wholesaler C sends the created receipt/shipment data to the traceability data center. The central processing unit of the traceability data center stores the received receipt/shipment data in the external storage device (step 1012).

The box with the ID of 310 is received at the retailer D (step 1300).

The receipt/shipment data creating means of the retailer D reads the ID of the box being a received article (step 1301).

The receipt/shipment data creating means of the retailer D creates receipt/shipment data with the number 310 input for the ID, a receipt date and time input for the date and time, the retailer D input for the site name, the wholesaler C input for the receipt/shipment destination, and receipt input for the process (step 1302).

The receipt/shipment data creating means of the retailer D sends the created receipt/shipment data to the traceability data center. The central processing unit of the traceability data center stores the received receipt/shipment data in the external storage device (step 1303).

The index data creating means of the retailer D reads the ID of the box before the box is unpacked (step 1304).

The index data creating means of the retailer D reads the IDs of two cut meats taken out by unpacking the box (step 1305).

The index data creating means of the retailer D creates index data with the number 310 input for the pre-unpacking ID (Before), numbers 1001 and 1002 input for the post-unpacking IDs (After), and unpacking input for the process (step 1306).

The index data creating means of the retailer D reads the IDs of two cut meats before the cut meat with the ID of 1001 and the cut meat with the ID of 9001 are processed together into a ground meat (step 1307).

The index data creating means of the retailer D attaches a tag with the ID of 11-111 to one ground meat obtained by processing two cut meats together (step 1308).

The index data creating means of the retailer D creates index data with numbers 1001 and 9001 input for the pre-processing IDs (Before), the number 11-111 input for the post-processing ID (After), and processing input for the process (step 1309).

The index data creating means of the retailer D sends the created index data to the traceability data center. The central processing unit of the traceability data center stores the received index data in the external storage device (step 1310).

The receipt/shipment data creating means of the retailer D reads the ID of the ground meat being a shipped article (step 1311).

The receipt/shipment data creating means of the retailer D creates receipt/shipment data with the number 11-111 input for the ID, a shipment date and time input for the date and time, the retailer D input for the site name, the consumer input for the receipt/shipment destination, and shipment input for the process (step 1312).

The receipt/shipment data creating means of the retailer D sends the created receipt/shipment data to the traceability data center. The central processing unit of the traceability data center stores the received receipt/shipment data in the external storage device to end the process (step 1313). The process described above allows receipt/shipment data and index data to be created at sites of the producer A, processor B, wholesaler C and retailer D.

Figure 5:
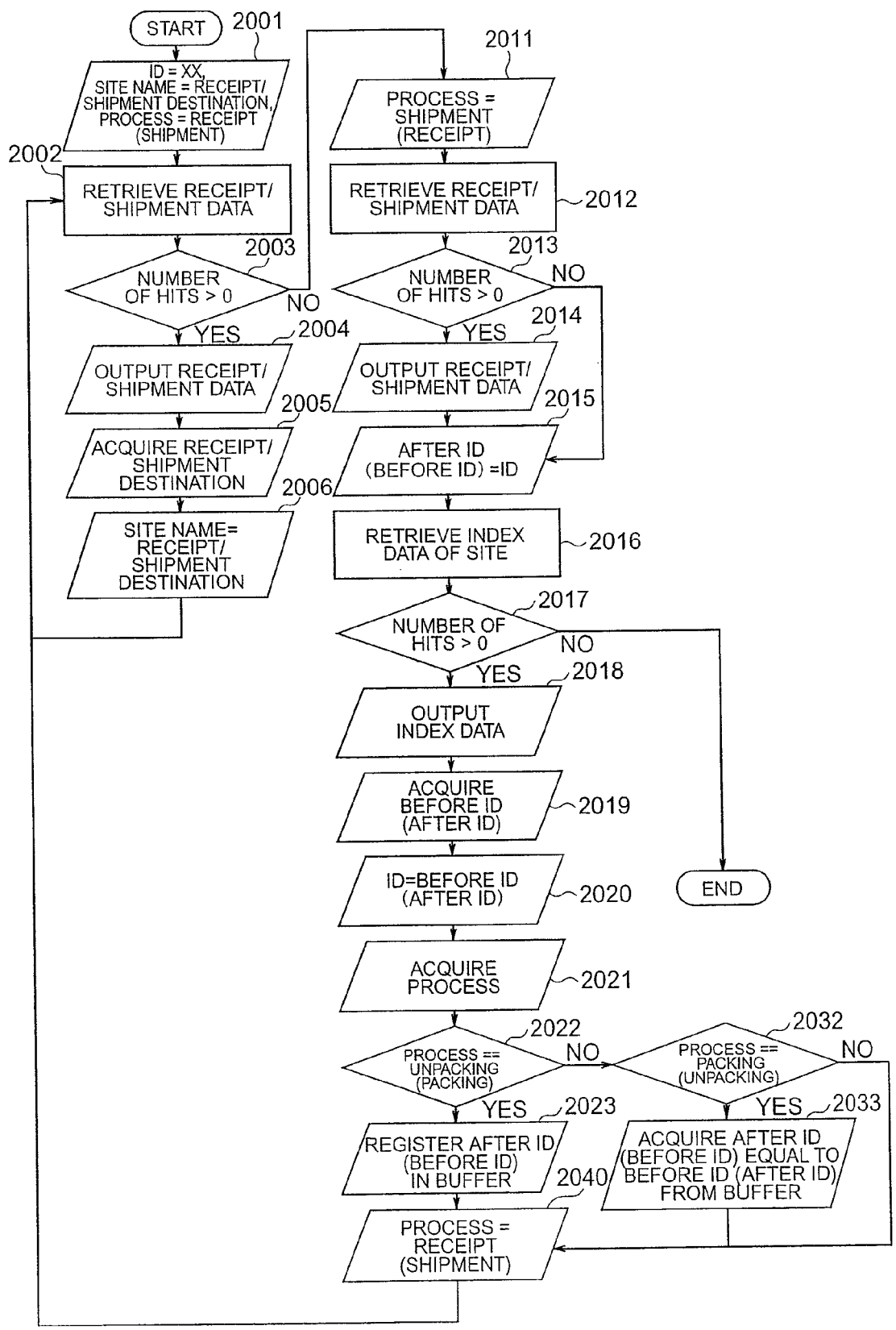
FIG. 5 is a flowchart showing a flow of a process using data collected when the present invention is applied to the meat industry.

A flow of a process in which the central processing unit of the traceability data center outputs trace-back information of the ground meat with the ID of 11-111 received at the retailer D is shown in FIG. 5.

As a condition for retrieving receipt/shipment data, the number 11-111 is set for the ID, the retailer D is set for the site name, and receipt is set for the process (step 2001).

Data in which the ID is 11-111, the site name is the retailer D and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 11-111, the site name is the retailer D and the process is receipt is 0 (step 2003).

As a condition for retrieving receipt/shipment data, shipment is set for the process (step 2011).

Data in which the ID is 11-111, the site name is the retailer D and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 11-111, the site name is the retailer D and the process is shipment is 1 (step 2013).

Receipt/shipment data hit at step 2013 is output as traceability information (step 2014).

As a condition for retrieving index data, the ID of 11-111 of the condition for retrieving receipt/shipment data is set for After ID (step 2015).

Data in which After ID is 11-111 is retrieved from index data of the retailer D stored in the external storage device of the traceability data center (step 2016).

Whether the number of hits as a result of retrieval at step 2016 is 0, or 1 or more is checked. The number of hits of index data in which After ID is 11-111 is 2 (step 2017).

Two index data hit at step 2017 is output as traceability information (step 2018).

Before IDs (1001 and 9001) are acquired from two index data hit at step 2017 (step 2019).

As a condition for retrieving receipt/shipment data, Before IDs of 1001 and 9001 acquired at step 2019 are set for the ID (step 2020).

Processes (processing) are acquired from 2 index data hit at step 2017 (step 2021).

Whether the processes acquired at step 2021 are unpacking is checked. None of the processes of index data in which Before IDs are 1001 and 9001 is unpacking (step 2022).

Whether the processes acquired at step 2021 are packing is checked. None of the processes of index data in which Before IDs are 1001 and 9001 is packing (step 2032).

As a condition for retrieving receipt/shipment data, receipt is set for the process (step 2040).

Data in which the ID is 1001 or 9001, the site name is retailer D and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 1001 or 9001, the site name is the retailer D and the process is receipt is 0 (step 2003).

As a condition for retrieving receipt/shipment data, shipment is set for the process (step 2011).

Data in which the ID is 1001 or 9001, the site name is the retailer D and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 1001 or 9001, the site name is the retailer D and the process is shipment is 0 (step 2013).

As a condition for retrieving index data, IDs of 1001 and 9001 of the condition for retrieving receipt/shipment data are set for After IDs (step 2015).

Data in which After ID is 1001 or 9001 is retrieved from index data of the retailer D stored in the external storage device of the traceability data center (step 2016).

Whether the number of hits as a result of retrieval at step 2016 is 0, or 1 or more is checked. The number of hits of index data in which After ID is 1001 is 1, and the number of hits of index data in which After ID is 9001 is 0 (step 2017).

One index data hit at step 2017 is output as traceability information (step 2018).

Before ID (310) is acquired from one index data hit at step 2017 (step 2019).

As a condition for retrieving receipt/shipment data, Before ID of 310 acquired at step 2019 is set for the ID (step 2020).

A process (unpacking) is acquired from one index data hit at step 2017 (step 2021).

Whether the process acquired at step 2021 is unpacking is checked. The process of index data in which Before ID is 310 is unpacking (step 2022).

The After ID (1001) is stored in a buffer of the traceability data center (step 2023).

As a condition for retrieving receipt/shipment data, the process is changed to receipt (step 2040).

Data in which the ID is 310, the site name is the retailer D and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 310, the site name is the retailer D and the process is receipt is 1 (step 2003).

Receipt/shipment data hit at step 2003 is output as traceability information (step 2004).

A receipt/shipment destination (wholesaler C) is acquired from receipt/shipment data hit at step 2003 (step 2005).

As a condition for retrieving receipt/shipment data, the wholesaler C being the receipt/shipment destination acquired at step 2005 is set for the name of the destination (step 2006).

Data in which the ID is 310, the site name is the wholesaler C and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 310, the site name is wholesaler C and the process is receipt is 0 (step 2003).

As a condition for retrieving receipt/shipment data, shipment is set for the process (step 2011).

Data in which the ID is 310, the site name is wholesaler C and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 310, the site name is wholesaler C and the process is shipment is 1 (step 2013).

Receipt/shipment data hit at step 2013 is output as traceability information (step 2014).

As a condition for retrieving index data, the ID of 310 of the condition for retrieving receipt/shipment data is set for After ID (step 2015).

Data in which After ID is 310 is retrieved from index data stored in the external storage device of the wholesaler C (step 2016).

Whether the number of hits as a result of retrieval at step 2016 is 0, or 1 or more is checked. The number of hits of index data in which After ID is 310 is 1 (step 2017).

One index data hit at step 2017 is output as traceability information (step 2018).

Before ID of 501 is acquired from one index data hit at step 2017 (step 2019).

As a condition for retrieving receipt/shipment data, Before ID of 501 acquired from acquired at step 2019 is set for the ID (step 2020).

A process (assortment) is acquired from one index data hit at step 2017 (step 2021).

Whether the process acquired at step 2021 is unpacking is checked. The process of index data in which Before ID is 501 is not unpacking (step 2022).

Whether the process acquired at step 2021 is packing is checked. The process of index data in which Before ID is 501 is not packing (step 2032).

As a condition for retrieving receipt/shipment data, receipt is set for the process (step 2040).

Data in which the ID is 501, the site name is the retailer C and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 501, the site name is the retailer C and the process is receipt is 1 (step 2003).

Receipt/shipment data hit at step 2003 is output as traceability information (step 2004).

A receipt/shipment destination (processor B) is acquired from receipt/shipment data hit at step 2003 (step 2005).

As a condition for retrieving receipt/shipment data, the processor B being the receipt/shipment destination acquired at step 2005 is set for the site name (step 2006).

Data in which the ID is 501, the site name is the processor B and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 501, the site name is the processor B and the process is receipt is 0 (step 2003).

As a condition for retrieving receipt/shipment data, shipment is set for the process (step 2011).

Data in which the ID is 501, the site name is the processor B and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 501, the site name is the processor B and the process is shipment is 1 (step 2013).

Receipt/shipment data hit at step 2013 is output as traceability information (step 2014).

As a condition for retrieving index data, the ID of 501 of the condition for retrieving receipt/shipment data is set for After ID (step 2015).

Data in which After ID is 501 is retrieved from index data stored in the external storage device of the processor B (step 2016).

Whether the number of hits as a result of retrieval at step 2016 is 0, or 1 or more is checked. The number of hits of index data in which After ID is 501 is 2 (step 2017).

Two index data hit at step 2017 are output as traceability information (step 2018).

Before IDs (1001 and 2001) are acquired from two index data hit at step 2017 (step 2019).

As a condition for retrieving receipt/shipment data, Before IDs of 1001 and 2001 acquired at step 2019 are set for the ID (step 2020).

Processes (packing) are acquired from two index data hit at step 2017 (step 2021).

Whether the processes acquired at step 2021 are unpacking is checked. None of the processes of index data in which IDs are 1010 and 2001 is unpacking (step 2022).

Whether the processes acquired at step 2021 are packing is checked. Both the processes of index data in which IDs are 1001 and 2001 are packing (step 2032).

After ID equal to Before ID (1001 or 2001) is retrieved from the buffer of the traceability data center. After ID (1001) is acquired, and as a condition for retrieving receipt/shipment data, only the number 1001 is set for the ID (step 2023).

As a condition for retrieving receipt/shipment data, receipt is set for the process (step 2040).

Data in which the ID is 1001, the site name is the processor B and the process is shipment is retrieved from receipt/shipment data stored in the traceability data center (step 2002).

Whether the number of hits as a result of retrieval at step 2002 is 0, or 1 or more is checked. The number of hits of receipt/shipment data in which the ID is 1001, the site name is the processor B and the process is receipt is 0 (step 2003).

As a condition for retrieving receipt/shipment data, shipment is set for the process (step 2011).

Data in which the ID is 1001, the site name is the processor B and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 1001, the site name is the processor B and the process is shipment is 0 (step 2013).

As a condition for retrieving index data, the ID of 1001 of the condition for retrieving receipt/shipment data is set for After ID (step 2015).

Data in which After ID is 1001 is retrieved from index data stored in the external storage device of the processor B (step 2016).

Whether the number of hits as a result of retrieval at step 2016 is 0, or 1 or more is checked. The number of hits of index data in which After ID is 1001 is 1 (step 2017).

One index data hit at step 2017 is output as traceability information (step 2018).

Before ID (100) is acquired from one index data hit at step 2017 (step 2019).

As a condition for retrieving receipt/shipment data, Before ID of 100 acquired at step 2019 is set for the ID (step 2020).

A process (dressing) is acquired from one index data hit at step 2017 (step 2021).

Whether the process acquired at step 2021 is unpacking is checked. The process of index data in which Before ID is 100 is not unpacking (step 2022).

Whether the process acquired at step 2021 is packing is checked. The process of index data in which Before ID is 100 is not packing (step 2032).

As a condition for retrieving receipt/shipment data, the process is changed to receipt (step 2040).

Data in which the ID is 100, the site name is the processor B and the process is receipt is retrieved from receipt/shipment stored in the external storage device of the traceability data center (step 2002).

Whether the number of hits as a result of retrieval at step 2002 is 0, or 1 or more is checked. The number of hits of receipt/shipment data in which the ID is 100, the site name is the processor B and the process is receipt is 1 (step 2003).

Receipt/shipment data hit at step 2003 is output as traceability information (step 2004).

A receipt/shipment destination (producer A) is acquired from receipt/shipment data hit at step 2003 (step 2005).

As a condition for retrieving receipt/shipment data, the producer A being the receipt/shipment destination acquired at step 2005 is set for the site name (step 2006).

Data in which the ID is 100, the site name is the producer A and the process is receipt is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 100, the site name is the producer A and the process is receipt is 0 (step 2003).

As a condition for retrieving receipt/shipment data, shipment is set for the process (step 2011).

Data in which the ID is 100, the site name is the producer A and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 100, the site name is the producer A and the process is shipment is 1 (step 2013).

Receipt/shipment data hit at step 2013 is output as traceability information (step 2014).

As a condition for retrieving index data, the ID of 100 of the condition for retrieving receipt/shipment data is set for After ID (step 2015).

Data in which After ID is 100 is retrieved from index data of the producer A stored in the external storage device of the traceability data center (step 2016).

Whether the number of hits as a result of retrieval at step 2016 is 0, or 1 or more is checked. The number of hits of index data in which After ID is 100 is 0 and the process is ended (step 2017).

The process described above allows the ground meat with the ID of 11-111 to be traced back from the consumer to the retailer D to the wholesaler C to the processor B to the producer A to output the ID (100) of beef cattle that is a raw material.

A flow of a process in which the central processing unit of the traceability data center outputs trace-forward information of beef cattle with the ID of 100 produced by the producer A is shown in FIG. 5.

As a condition for retrieving receipt/shipment data, the number 100 is set for the ID, the producer A is set for the site name and shipment is set for the process (step 2001).

Data in which the ID is 100, the site name is the producer A and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 100, the site name is the producer A and the process is shipment is 1 (step 2003).

Receipt/shipment data hit at step 2003 is output as traceability information (step 2004).

A receipt/shipment destination (processor B) is acquired from receipt/shipment data hit at step 2003 (step 2005).

As a condition for retrieving receipt/shipment data, the processor B being the receipt/shipment destination acquired at step 2005 is set for the site name (step 2006).

Data in which the ID is 100, the site name is the processor B and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 100, the site name is the processor B and the process is shipment is 0 (step 2003).

As a condition for retrieving receipt/shipment data, receipt is set for the process (step 2011).

Data in which the ID is 100, the site name is the processor B and the process is receipt is retrieved from receipt/shipment stored in the external storage device of the traceability data center (step 2012).

Whether the number of hits as a result of retrieval at step 2012 is 0, or 1 or more is checked. The number of hits of receipt/shipment data in which the ID is 100, the site name is the processor B and the process is receipt is 1 (step 2013).

Receipt/shipment data hit at step 2013 is output as traceability information (step 2014).

As a condition for retrieving index data, the ID of 100 of the condition for retrieving receipt/shipment data is set for Before ID (step 2015).

Data in which Before ID is 100 is retrieved from index data stored in the external storage device of the processor B (step 2016).

Whether the number of hits as a result of retrieval at step 2016 is 0, or 1 or more is checked. The number of hits of index data in which After ID is 100 is 2 (step 2017).

Two index data hit at step 2017 are output as traceability information (step 2018).

After IDs (1001 and 1002) are acquired from two index data hit at step 2017 (step 2019).

As a condition for retrieving receipt/shipment data, After IDs of 1001 and 1002 acquired at step 2019 are set for the ID (step 2020).

Processes (dressing) are acquired from two index data hit at step 2017 (step 2021).

Whether the processes acquired at step 2021 are packing is checked. None of the processes of index data in which After IDs are 1001 and 1002 is packing (step 2022).

Whether the processes acquired at step 2021 are unpacking is checked. None of the processes of index data in which After IDs are 1001 and 1002 is unpacking (step 2032).

As a condition for retrieving receipt/shipment data, shipment is set for the process (step 2040).

Data in which the ID is 1001 or 1002, the site name is the processor B and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 1001 or 1002, the site name is the processor B and the process is receipt is 0 (step 2003).

As a condition for retrieving receipt/shipment data, receipt is set for the process (step 2011).

Data in which the ID is 1001 or 1002, the site name is the processor B and the process is shipment is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 1001 or 1002, the site name is the processor B and the process is shipment (step 2013).

As a condition for retrieving index data, IDs of 1001 and 1002 of the condition for retrieving receipt/shipment data are set for Before ID (step 2015).

Data in which Before ID is 1001 or 1002 is retrieved from index data stored in the external storage device of the processor B (step 2016).

Whether the number of hits as a result of retrieval at step 2016 is 0, or 1 or more is checked. The number of hits of index data in which Before ID is 1001 is 1, and the number of hits of index data in which before ID is 1002 is 0 (step 2017).

One index data hit at step 2017 is output as traceability information (step 2018).

After ID (501) is acquired from one index data hit at step 2017 (step 2019).

As a condition for retrieving receipt/shipment data, After ID of 501 acquired at step 2019 is set for the ID (step 2020).

A process (packing) is acquired from one index data hit at step 2017 (step 2021).

Whether the process acquired at step 2021 is packing is checked. The process of index data in which After ID is 501 is packing (step 2022).

Before ID (1001) is stored in the buffer of the traceability data center (step 2023).

As a condition for retrieving receipt/shipment data, the process is changed to shipment (step 2040).

Data in which the ID is 501, the site name is the processor B and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 501, the site name is the processor B and the process is shipment is 1 (step 2003).

Receipt/shipment data hit at step 2003 is output as traceability information (step 2004).

A receipt/shipment destination (wholesaler C) is acquired from receipt/shipment data hit at step 2003 is acquired (step 2005).

As a condition for retrieving receipt/shipment data, the wholesaler C being the receipt/shipment destination acquired at step 2005 is set for the site name (step 2006).

Data in which the ID is 501, the site name is the wholesaler C and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 501, the site name is wholesaler C and the process is shipment is 0 (step 2003).

As a condition for retrieving receipt/shipment data, receipt is set for the process (step 2011).

Data in which the ID is 501, the site name is the wholesaler C and the process is receipt is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 501, the site name is the wholesaler C and the process is receipt is 1 (step 2013).

Receipt/shipment data hit at step 2013 is output as traceability information (step 2014).

As a condition for retrieving index data, the ID of 501 of the condition for retrieving receipt/shipment data is set for Before ID (step 2015).

Data in which Before ID is 501 is retrieved from index data stored in the external storage device of the wholesaler C (step 2016).

Whether the number of hits as a result of retrieval at step 2016 is 0, or 1 or more is checked. The number of hits of index data in which Before ID is 501 is 1 (step 2017).

One index data hit at step 2017 is output as traceability information (step 2018). After ID (310) is acquired from one index data hit at step 2017 (step 2019).

As a condition for retrieving receipt/shipment data, After ID of 310 acquired at step 2019 is set for the ID (step 2020).

A process (assortment) is acquired from one index data hit at step 2017 (step 2021).

Whether the process acquired at step 2021 is packing is checked. The process of index data in which After ID is 310 is not packing (step 2022).

Whether the process acquired at step 2021 is unpacking is checked. The process of index data in which After ID is 310 is not unpacking (step 2032).

As a condition for retrieving receipt/shipment data, shipment is set for the process (step 2040).

Data in which the ID is 310, the site name is the wholesaler C and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 310, the site name is the wholesaler C and the process is shipment is 1 (step 2003).

Receipt/shipment data hit at step 2003 is output as traceability information (step 2004).

A receipt/shipment destination (wholesaler D) is acquired from receipt/shipment data hit at step 22003 (step 2005).

As a condition for retrieving receipt/shipment data, the wholesaler D being the receipt/shipment destination acquired at step 2005 is set for the site name (step 2006).

Data in which the ID is 310, the site name is the retailer D and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 310, the site name is the retailer D and the process is shipment is 0 (step 2003).

As a condition for retrieving receipt/shipment data, receipt is set for the process (step 2011).

Data in which the ID is 310, the site name is the retailer D and the process is receipt is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 310, the site name is the retailer D and the process is receipt is 1 (step 2013).

Receipt/shipment data hit at step 2013 is output as traceability information (step 2014).

As a condition for retrieving index data, the ID of 310 of the condition for retrieving receipt/shipment data is set for Before ID (step 2015).

Data in which Before ID is 310 is retrieved from index data of the retailer D stored in the external storage device of the traceability data center (step 2016).

Whether the number of hits as a result of retrieval at step 2016 is 0, or 1 or more is checked. The number of hits of index data in which Before ID is 310 is 2 (step 2017).

Two index data hit at step 2017 is output as traceability information (step 2018).

After IDs (1001 and 2001) are acquired from two index data hit at step 2017 (step 2019).

As a condition for retrieving receipt/shipment data, After IDs of 1001 and 2001 acquired at step 2019 are set for the ID (step 2020).

Processes (unpacking) are acquired from twp index data hit at step 2017 (step 2021).

Whether the processes acquired at step 2021 are packing is checked. None of the processes of index data in which After IDs are 1001 and 2001 is packing (step 2022).

Whether the processes acquired at step 2021 are unpacking is checked. Both the processes of index data in which After IDs are 1001 and 2001 are unpacking (step 2032).

Before ID equal to After ID (1001 or 2001) is retrieved from the buffer of the traceability data center. Before ID (1001) is acquired, and as a condition for retrieving receipt/shipment data, only the number 1001 is set for the ID (step 2023).

As a condition for retrieving receipt/shipment data, shipment is set for the process (step 2040).

Data in which the ID is 1001, the site name is the retailer D and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 1001, the site name is the retailer D and the process is shipment is 0 (step 2003).

As a condition for retrieving receipt/shipment data, receipt is set for the process (step 2011).

Data in which the ID is 1001, the site name is the retailer D and the process is receipt is retrieved from receipt/shipment data stored in the external storage device of the traceability data center (step 2012).

Whether the number of hits as a result of retrieval at step 2012 is 0, or 1 or more is checked. The number of hits of receipt/shipment data in which the ID is 1001, the site name is the retailer D and the process is receipt is 0 (step 2013).

As a condition for retrieving index data, the ID of 1001 of the condition for retrieving receipt/shipment data is set for Before ID (step 2015).

Data in which Before ID is 1001 is retrieved from index data of the retailer D stored in the external storage device of the traceability data center (step 2016).

Whether the number of hits as a result of retrieval at step 2016 is 0, or 1 or more is checked. The number of hits of index data in which Before ID is 1001 is 1 (step 2017).

One index data hit at step 2017 is output as traceability information (step 2018).

After ID (11-111) is acquired from one index data hit at step 2017 (step 2019).

As a condition for retrieving receipt/shipment data, After ID of 11-111 acquired at step 2019 is set for the ID (step 2020).

A process (processing) is acquired from one index data hit at step 2017 (step 2021).

Whether the process acquired at step 2021 is packing is checked. The process of index data in which After ID is 11-111 is not packing (step 2022).

Whether the process acquired at step 2021 is unpacking is checked. The process of index data in which After ID is 11-111 is not unpacking (step 2032).

As a condition for retrieving receipt/shipment data, the process is changed to shipment (step 2040).

Data in which the ID is 11-111, the site name is the retailer D and the process is shipment from receipt/shipment data stored in the external storage device of the traceability data center (step 2002).

Whether the number of hits as a result of retrieval at step 2002 is 0, or 1 or more is checked. The number of hits of receipt/shipment data in which the ID is 11-111, the site name is the retailer D and the process is dispatch is 1 (step 2003).

Receipt/shipment data hit at step 2003 is output as traceability information (step 2004).

A receipt/shipment destination (consumer) is acquired from receipt/shipment data hit at step 2003 is acquired (step 2005).

As a condition for retrieving receipt/shipment data, the consumer being the receipt/shipment destination acquired at step 2005 is set for the site name (step 2006). Data in which the ID is 11-111, the site name is the consumer and the process is shipment is retrieved from receipt/shipment data stored in the external storage device of the traceability data center (step 2002).

Whether the number of hits as a result of retrieval at step 2002 is 0, or 1 or more is checked. The number of hits of receipt/shipment data in which the ID is 11-111, the site name is the consumer and the process is shipment is 0 (step 2003).

As a condition for retrieving receipt/shipment data, receipt is set for the process (step 2011).

Data in which the ID is 11-111, the site name is the consumer and the process is receipt is retrieved from receipt/shipment data stored in the external storage device of the traceability data center (step 2012).

Whether the number of hits as a result at step 2012 is 0, or 1 or more is checked. The number of hits of receipt/shipment data in which the ID is 11-111, the site name is the consumer and the process is receipt is 0 (step 2013).

As a condition for retrieving index data, the ID of 11-111 of the condition for retrieving receipt/shipment data is set for Before ID (step 2015).

Data in which Before ID is 11-111 is retrieved from index data of the consumer stored in the external storage device of the traceability data center (step 2016).

Whether the number of hits as a result of retrieval at step 2016 is 0, 1 or more is checked. The number of hits of index data in which Before ID is 11-111 is 0, and the process is ended (step 2017).

The process described above allows beef cattle with the ID of 100 to be traced back from the producer A to the processor B to the wholesaler C to the consumer to output the name of the site at which the product of which the raw material is the beef cattle with the ID of 100 currently exists.

Example 2

In this example, a mode for carrying out the present invention when articles cannot be traced using time information because process history data sent from each site has no or incorrect time information and thus the process history data is sent in an order different from that for the actual process in Example 1 will be described.

In this example, as shown in FIG. 3, the trace object is a meat, and sites are a plurality of processors (A, B, C, D) dressing beef cattle into cut meats, a plurality of wholesalers (A, B, C, D) assorting cut meats for retailers, and a plurality of retailers (A, B, C, D) processing a plurality of cut meats together into a ground meat. In the processor B, boxes with IDs of 501 and 502 are shipped to the wholesaler C. In the wholesaler C, the boxes with IDs of 501 and 502 are received from the processor B, a tag with the ID of 310 is attached to the box with the ID of 501 for assortment, and the box with the ID of 310 is shipped to the retailer D. The box with the ID of 502 is shipped to the retailer A. The box with the ID of 310 is received from the wholesaler C in the retailer D, and the box with the ID of 502 is received from the wholesaler C in the retailer A.

In this example, configurations in common with Example 1 are not described.

Figure 6:
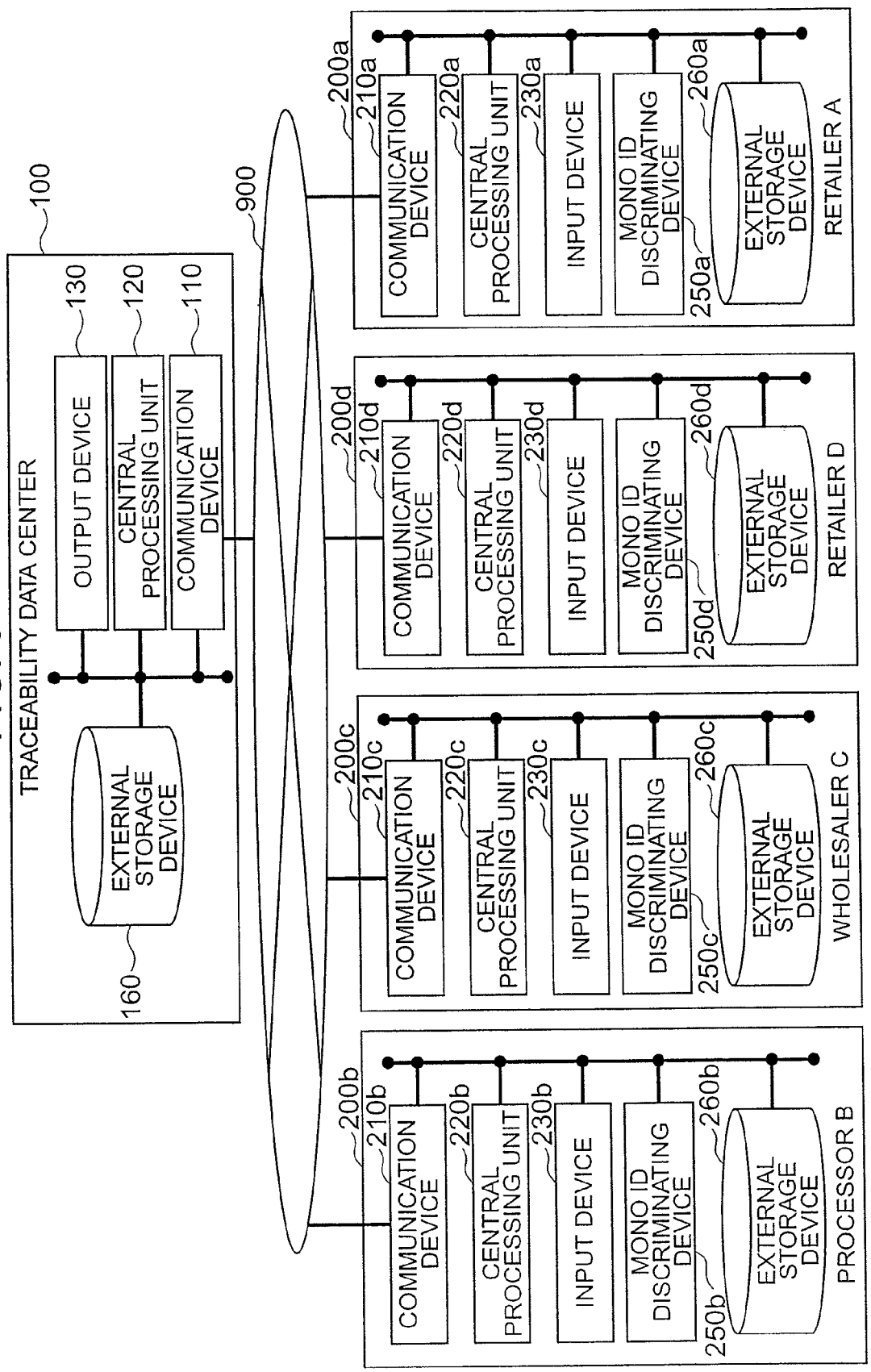
FIG. 6 is a block diagram showing an embodiment when the present invention is applied to the meat industry.

FIG. 6 is a block diagram showing a system of this example. The system comprises a traceability data center 100, a processor B200*b* dressing beef cattle into cut meats, a wholesaler C200*c* assorting cut meats for retailers, a retailer D200*d* processing a plurality of cut meats together into a ground meat, a retailer A200*a*, and a network 900 such as a telephone line, a LAN and a dedicated line. The traceability data center 100 collects information required for traceability from a site 200 and outputs trace-back information and trace-forward information to outside, and comprises communication devices 110 such as a modem, a router and a terminal adapter, a central processing unit 120 such as a CPU, output devices 130 such as a display, a printer, a FAX and an electronic data output, and an external storage device 160 such as a hard disk. The processor B200*b*, the wholesaler C200*c*, the retailer D200*d* and the retailer A200*a* manage a trace object during receipt/shipment and processing, and comprise communication devices 210 (*a, b, c, d*) such as modems, routers, terminal adapters and FAX, central processing units 220 (*a, b, c, d*) such as CPUs, input devices 230 (a, b, c, d) such as keyboards and touch panels, mono ID discriminating devices 250 (*a, b, c, d*) such as barcode readers, two-dimensional code readers and RFID readers, and external storage devices 260 (*a, b, c, d*) such as hard disks. The traceability data center 100, the processor B200*b*, the wholesaler C200*c*, the retailer D200*d* and the retailer A200*a* are interconnected via the network 900 using the communication devices (a, b, c, d).

FIG. 7 shows one example of process history data 22 which is output at sites 200. The process history data 22 stores history data of processing of a trace object. Process history data 22*b* is process history data which is output during the shipment process at the processor B, has an item of a mono ID related to the trace object, an item of a date and time on which the trace object was shipped, an item of the name of a site from which the trace object was shipped, an item of the name of a site to which the trace object is shipped, and an item of the type of process, and is output by, for example, a shipment managing system in the processor B. Process history data 22*c* is process history data which is output during the assortment process at the wholesaler C, has an item of a mono ID related to the trace object before assortment, an item of a mono ID related to the trace object after assortment, an item of a date and time on which the trace object was assorted, an item of the name of a site at which the trace object was assorted, and an item of the type of process, and is output by, for example, an assortment managing system in the wholesaler C. Process history data 22*a* is process history data which is output during the shipment process at the wholesaler C, has an item of a mono ID related to the trace object, an item of a date and time on which the trace object was shipped, an item of the name of a site from which the trace object was shipped, an item of the name of a site to which the trace object is shipped, and an item of the type of process, and is output by, for example, a shipment managing system in the wholesaler C.

FIG. 8 shows one example of process history data 11 managed at the traceability center 100. The process history data 11 has an item of a process ID for uniquely managing a process, an item of a mono ID related to the trace object, an item of a date and time on which the trace object was processed, an item of the name of a site at which the trace object was processed, and an item of the type of process.

FIG. 9 shows one example of index data 12 managed at the traceability center 100. The index data 12 is data indicating a relation between a pre-process ID before a process, such as processing or packing, of the trace object in the site and a post-process ID, and has the pre-process ID (Before) and the post-process ID (After).

Figure 10:
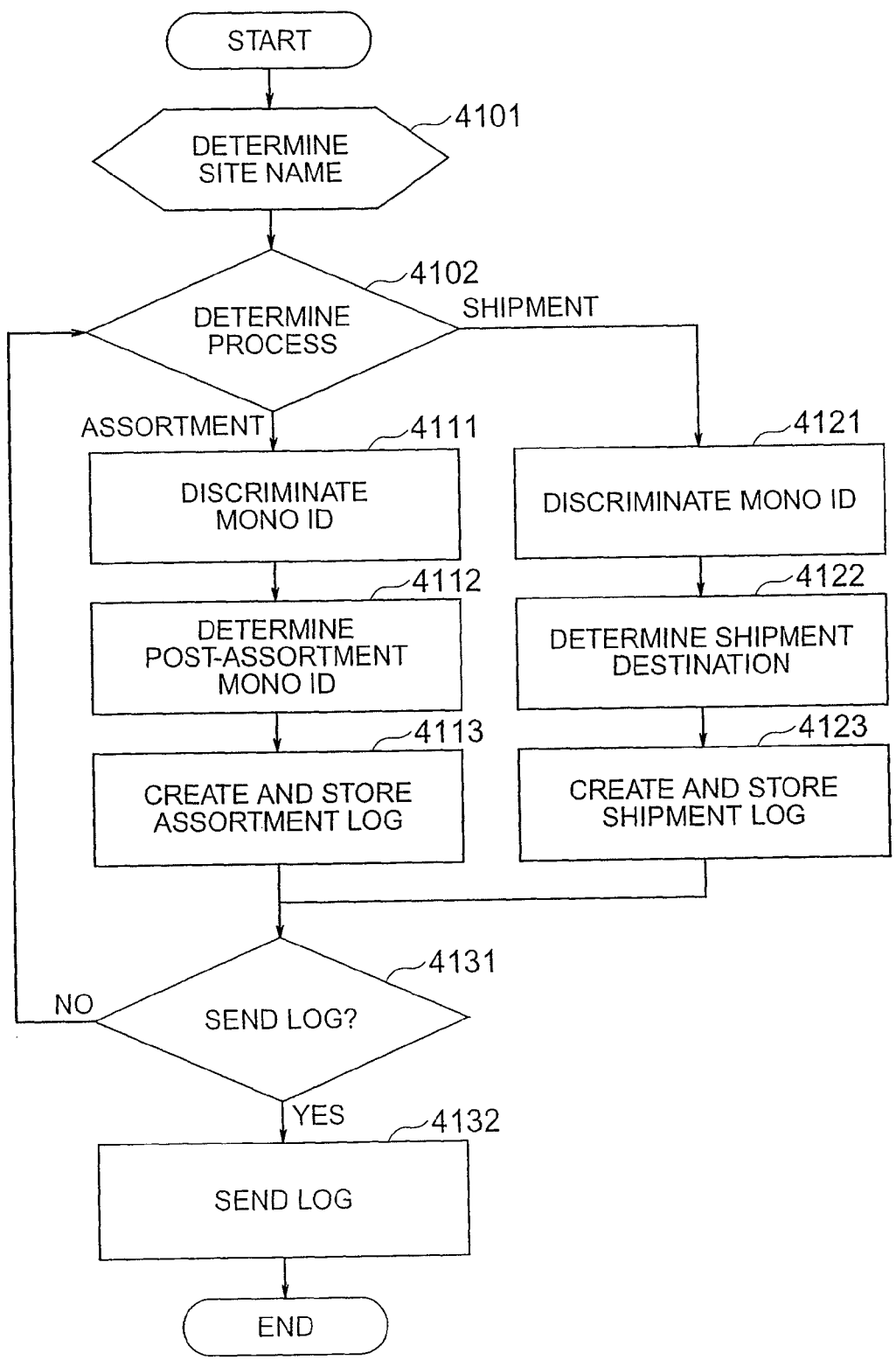
FIG. 10 is a flowchart showing a flow of a process for creating data at sites if the ID of a trace object is changed and the date and time across sites is not correct when the present invention is applied to the meat industry.

A flow of a process for creating process history data 22 in each site 200 is shown in FIG. 10. As preparation, the site name is determined from the input device 230 and stored in the external storage device 260. If this process is carried out at the wholesaler C200c, for example, the "site name" is determined to be the "wholesaler C" (step 4101).

The central processing unit 220 of the site 200 determines the type of process from the input device 230 before the trace object is processed. The type of process is, for example, "shipment", "assortment" or the like. If "assortment" is selected, processing proceeds to step 4111, and if "shipment" is selected, processing proceeds to step 4121 (step 4102).

If "assortment" is selected at step 4102, a mono ID related to the trace object is discriminated using the mono ID discriminating device 250. In this case, the "mono ID" is "501" (step 4111).

A new mono ID is given to the trace object according to an assortment instruction or the like. In this case, "310" is newly given to the trace object with the "mono ID" of "501" (step 4112).

Then, process history data 22 is created from information of steps 4101 to 4112, and stored in the external storage device 260. In this case, process history data 22c of FIG. 7 is created (step 4113).

If "shipment" is selected at step 4102, a mono ID related to the trace object is discriminated using the mono ID discriminating device 250. In this case, the "mono ID" is "310" (step 4121).

Then, a shipment destination is input from the input device 230 according to a shipment instruction or the like (step 4122).

Then, process history data 22 is created from information of steps 4101 to steps 4122, and stored in the external storage device 260. In this case, process history data 22a of is created (step 4123).

A user makes a selection on whether process history data 22 stored in the external storage device 260 is sent to the traceability center 100. Processing proceeds to step 4132 if YES, and processing proceeds to step 4102 if NO (step 4131).

If YES at step 4131, the central processing unit 220 sends process history data 22 to the traceability data center 100 using the communication device 210, and ends the process for creating process history data 22 at the site 200 (step 3107).

The process for creating process history data 22 at the site 200 as been described.

Figure 11:
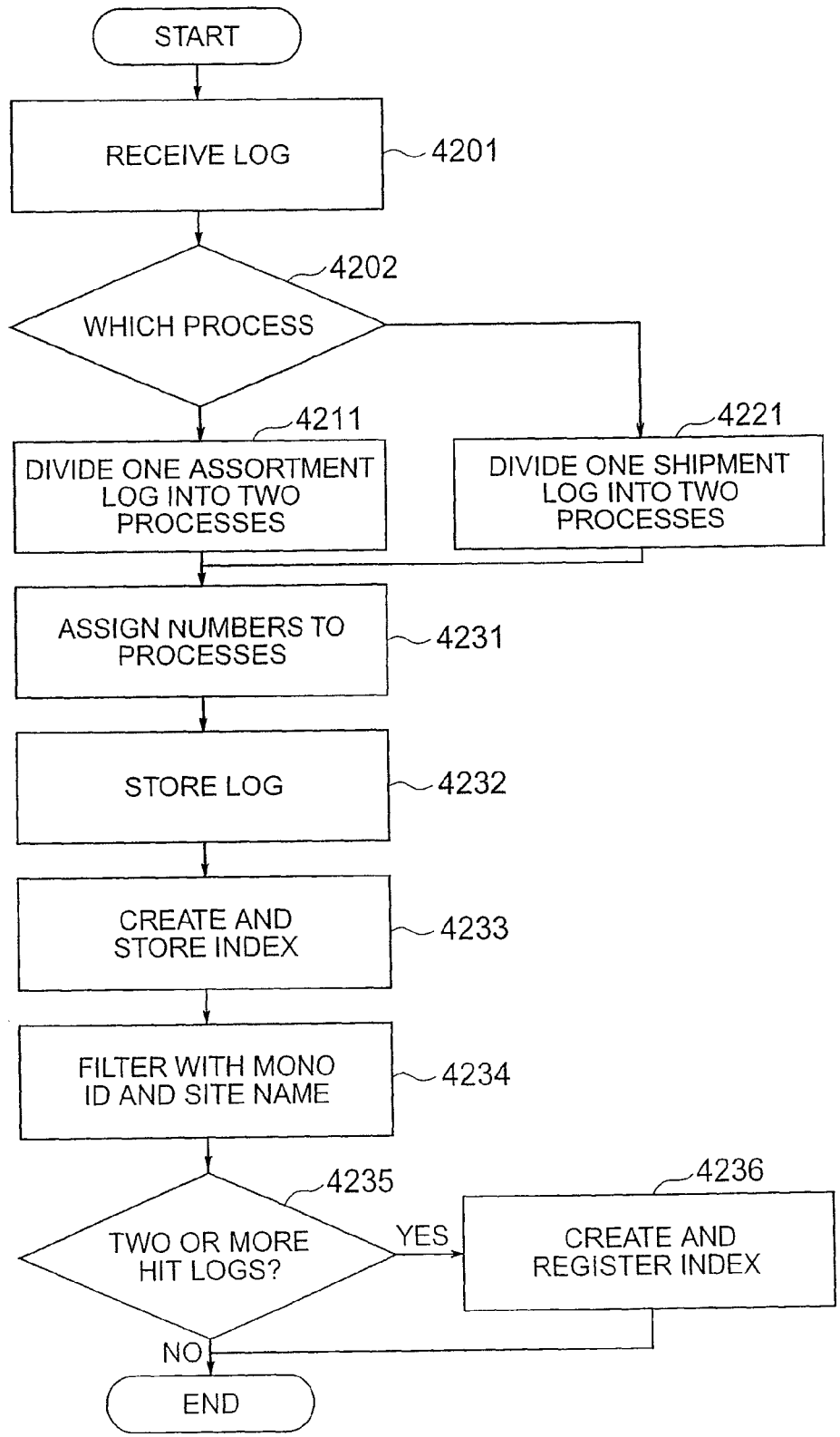
FIG. 11 is a flowchart showing a flow of a process for collecting data at the traceability data center if the ID of a trace object is changed and the date and time across sites is not correct when the present invention is applied to the meat industry.

Then, a flow of a process for creating and storing process history data 11 and index data 12 at the traceability data center 100 is shown in FIG. 11.

The central processing device 120 of the traceability data center 100 receives process history data 22 sent from each site 200 using the communication device (step 4201).

The item of the process of the received process history data 22 is examined. The process is, for example, "shipment", "assortment" or the like. If the process is "assortment", processing proceeds to step 4211, and if the process is "shipment", processing proceeds to step 4221 (step 4202).

If the process of process history data 22 is "assortment" at step 4202, one assortment process history data 22 is divided into pre-assortment and post-assortment two process history data such that they have one mono ID.

For the item of the mono ID, at this time, the value of the item of the pre-assortment mono ID of process history data 22 is set for one data, and the value of the post-assortment mono ID of process history data 22 is set for the other data. Same values are set for the item of the date and time, the item of the site name and the item of the process. For example, process history data 22c of FIG. 7 has two mono IDs, and therefore as in records with "process IDs" of "123456-05" and "123456-06" in process history data of FIG. 8, the "mono ID" is divided into "501" and "310", and same values are set for the "date and time", the "site name" and the "process" (step 4211).

If the item of the process of process history data 22 is "shipment" at step 4202, one assortment process history data 22 is divided into two process history data: shipment process and receipt process, such that they have one mono ID. For the item of the mono ID, at this time, the same value is set for both data. For the item of the date and time, the value of the item of the date and time of process history data 22 is set for one data, and a blank is set for the other data. For the item of the site name, the value of the item of the site name of process history data 22 is set for one data, and the value of the item of the shipment destination of process history data 22 is set for the other data. For the item of the process, "shipment" is set for one data, and "receipt" is set for the other data. For example, the record with the "mono ID" of "310" in process history data 22a of FIG. 7 has two site names, and therefore as in records with "process IDs" of "123456-07" and "123456-08" in process history data 11 of FIG. 8, the "wholesaler C" and the "retailer D" are set for the "site name", "04/15 11:00" and a blank are set for the "date and time", "shipment" and "receipt" are set for the "process", and the same value is set for the "mono ID" (step 4221).

Then, numbers are assigned to the item of the process ID sequentially in order of reception for process history data 11 (step 4231).

Process history data 11 created at step 4231 is stored in the external storage device 160 of the traceability data center 100 (step 4232).

For mutually relating two process history data 11 divided at step 4211 or step 4221 and having numbers assigned to process IDs at step 4231, the pre-process ID is stored for the item of Before of index data 12, the post-process ID is stored for the item of After, and the index data 12 is stored in the external storage device 160 of the traceability data center 100 (step 4233). For example, for process history data 22 of FIG. 7, "123456-05" is set for the item of Before of index data 12, and "123456-06" is set for the item of After because the "process ID" of process history data 11 of FIG. 8 is divided into records of "123456-05" and "123456-06".

Then, one "mono ID" and one "site name" are designated from process history data 11 to extract "process IDs" of records having same values for both the items (step 4234). For example, if "310" is designated for the "mono ID" and the "wholesaler C" is designated for the "site name" from process history data, "process IDs" of "123456-06" and "123456-07" are extracted.

If there are two or more process IDs which are extracted at step 4234, then processing proceeds to step 4236, and if there is no process ID or one process ID which is extracted, the process for creating and storing process history data 11 and index data 12 is ended (step 4235).

If YES at step 4235, "process IDs" are arranged in ascending order, lower process IDs are stored for the item of Before of index data 12 and next lower process IDs are stored for the item of After in an alternative fashion, and the index data 12 is stored in the external storage device 160 of the traceability data center 100 (step 4236). For example, if "process IDs" of "123456-06" and "123456-07" are extracted, "123456-06" is set for the item of Before of index data 12, and "123456-07" is set for the item of After.

The process for creating and storing process history data 11 and index data 12 in the traceability data center 100 has been described.

Figure 12:
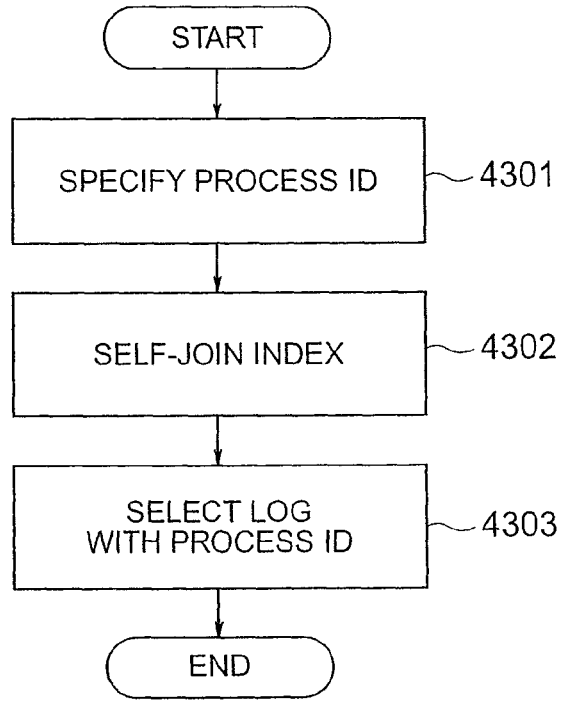
FIG. 12 is a flowchart showing a flow of a process using data collected if the ID of a trace object is changed and the date and time across sites is not correct when the present invention is applied to the meat industry.

A flow of a process for outputting trace information of the trace object is shown in FIG. 12.

The central processing unit 120 of the traceability data center 100 extracts data matching the "mono ID" of a targeted trace object and the "site name" at which tracing is started from process history data 11 stored in the external storage device 160. For example, if the "mono ID" of the targeted trace object is "501" and the "site name" is the "processor B", a record in which the "mono ID" is "501" and the "site name" is the "processor B" is extracted from process history data 11 of FIG. 8 (step 4301). In this case, the record with the "process ID" of "123456-01" is extracted.

Then, the central processing unit 120 retrieves the process ID extracted at step 4301 from the item of Before of index data 12. Values of items of After corresponding to values of items of Before of index data 12 are retrieved from the item of Before. This process is repeated until there is no retrieved result (step 4302). For example, "123456-01" is retrieved from the item of Before of index data 12. The value of the item of After of hit data is "123456-03". Then, "123456-03" is retrieved from the item of Before. The value of the item of After of hit data is "123456-05". Then, "123456-05" is retrieved from the item of Before. The value of the item of After of hit data is "123456-06". "123456-06" is retrieved from the item of Before. The value of the item of After of hit data is "123456-07". Then, "123456-07" is retrieved from the item of Before. The value of the item of After of hit data is "123456-08".

Then, the central processing unit 120 sequentially extracts "process IDs" hit at step 4302 from process history data 11 (step 4303). In this case, the "process IDs" are rearranged in the order of "123456-01", "123456-03", "123456-05", "123456-06", "123456-07" and "123456-08".

The central processing unit 120 outputs to the output device 130 trace information indicating that the trace object with the "mono ID" of "501" was processed in the order of the "processor B", the "wholesaler C" and the "retailer D" from the result of step 4303, and ends the process.

In this way, the user can trace the trace object.

Example 3

In this example, a mode for carrying out the present invention when no index data is required in Example 2 will be described.

In this example, as shown in FIG. 3, the trace object is a meat, sites are a plurality of processors (A, B, C, D) dressing beef cattle into cut meats, a plurality of wholesalers (A, B, C, D) assorting cut meats for retailers, and a plurality of retailers (A, B, C, D) processing a plurality of cut meats together into a ground meat. In the processor B, a box with the ID of 502 is shipped to the wholesaler C. In the wholesaler C, the box with the ID of 502 is received from the processor B, and the box with the ID of 502 is shipped to the retailer A. In the retailer A, the box with the ID of 502 is received from the wholesaler C.

In this example, configurations in common with Example 2 are not described.

The process for creating process history data 22 at each site 200 is not described because it is in common with Example 2.

A flow of a process for creating and storing process history data 11 at the traceability data center 100 will be described using FIG. 11.

The central processing unit 120 of the traceability data center 100 receives process history data 22 sent from each site 200 using the communication device 110 (step 4201).

The item of the process of received process history data 22 is examined. In this example, only "shipment" is covered, and therefore processing proceeds to step 4221 (step 4202).

If the item of the process of process history data 22 is "shipment" at step 4202, one assortment process history data 22 is divided into two process history data: shipment process and receipt process, such that they have one mono ID. For the item of the mono ID, at this time, the same value is set for both data. For the item of the date and time, the value of the item of the date and time of process history data 22 is set for one data, and a blank is set for the other data. For the item of the site name, the value of the item of the site name of process history data 22 is set for one data, and the value of the item of the shipment destination of process history data 22 is set for the other data. For the item of the process, "shipment" is set for one data, and "receipt" is set for the other data. For example, the record with the "mono ID" of "502" in process history data 22a of FIG. 7 has two site names, and therefore as in records with "process IDs" of "123456-09" and "123456-10" in process history data 11 of FIG. 8, the "wholesaler C" and the "retailer A" are set for the "site name", "04/15 12:00" and a blank are set for the "date and time", "shipment" and "receipt" are set for the "process", and the same value is set for the "mono ID" (step 4221).

Then, numbers are assigned to the item of the process ID sequentially in order of reception for process history data 11 (step 4231).

Process history data 11 created at step 4231 is stored in the external storage device 160 of the traceability data center 100 (step 4232).

The process for creating and storing process history data 11 at the traceability data center 100 has been described.

Figure 13:
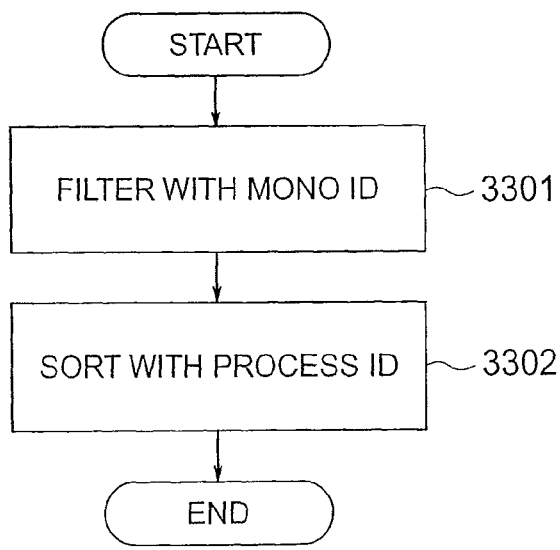
FIG. 13 is a flowchart showing a flow of a process using data collected if no index data is required when the present invention is applied to the meat industry.

A flow of a process for outputting trace information of the trace object is shown in FIG. 13.

The central processing unit 120 of the traceability data center 100 extracts data matching the "mono ID" of a targeted trace object from process history data 11 stored in the external storage device 160. For example, if the "mono ID" of the targeted trace object is "502", only records with the "mono ID" of "502" are extracted from process history data 11 of FIG. 8 (step 3301). In this case, records with "process IDs" of "123456-02", "123456-04", "123456-09" and "123456-10" are extracted.

Then, the central processing unit 120 compares the values of "process IDs", and rearranges them in ascending order (step 3302). In this case, the "process IDs" are rearranged in the order of "123456-2", "123456-04", "123456-09" and "123456-10".

The central processing unit 120 outputs to the output device 130 trace information indicating that the trace object with the "mono ID" of "502" was processed in the order of the "processor B", the "wholesaler C" and the "retailer A from the result of step 3302, and ends the process.

In this way, the user can trace the trace object.

Example 4

Example 4 of the present invention will now be described. This example covers the case where information schemes manipulated by information processing apparatuses in sites, i.e. the producer A, the processor B, the wholesaler C and the retailer D are different. Usually, in information processing apparatuses that are used in sites, schemes (format, item name, etc.) manipulated by the apparatuses are often not the same (particularly, schemes may be different among producers). If individual article information with data sent to the traceability data center from the producer A and the processor B having different schemes is recorded directly, the following problems may arise. For example, same individual articles are treated as different individual articles, and for items included in individual article information, different items are associated with each other, and same items are treated as different items. The problems are solved in this example. For this purpose, in this example, one of individual article information stored in the traceability center (traceability information) and individual article information sent from each site is converted to suit the other in accordance with a predetermined rule of individual article information. This eliminates necessity to convert individual article information into intermediate information common to each individual article information to be managed, and also eliminates necessity to convert all individual article information, thus making it possible to reduce a number of operations in information processing.

In a first method thereof, sent individual article information is sequentially converted to suit stored individual article information (traceability information). In a second method, sent individual article information is compared with stored individual article information, and individual article information is converted to suit information including all items of the individual article information. The method is more effective for articles, such as industrial products, in which the number of added items is larger in later steps. As a third method, the numbers of items included in individual article information are compared, and individual article information having a smaller number of items is converted to suit individual article information having a larger number of items.

First, the first method will be described.

First, at step 601, the producer A sends individual article information A shown in FIG. 14, tag indemnification information for identifying a tag (or individual article) recorded in a tag attached to the individual article, identification information A for identifying the producer A, and scheme information A indicating an information scheme in the producer A to the traceability center. That is, as individual article information A, an individual article ID "001" for identifying the individual article, a level "rank 1" indicating quality of the individual article, an examination date "Jan. 1, 00", an examination result "good" and a shipment date "Jan. 3, 00) are sent to the traceability center.

Then, at step 602, the traceability center receives the information. Step 603, a traceability database is searched using tag identification information.

If traceability information corresponding to tag identification information does not exist, individual article information sent as initial information is associated with tag identification information and identification information A, and recorded in the traceability database as traceability information at step 604.

If traceability information corresponding to tag identification information exists, processes same as those of step 607 and subsequent steps are carried out.

Then, at step 605, the processor B sends individual article information B, tag identification information, identification information B for identifying the processor B, and scheme information B indicating the information scheme in the processor B.

Then, at step 606, the traceability center searches the traceability database using tag identification information. If it is detected that individual article information A sent from the producer A is stored as a result, a conversion rule database is searched using scheme information A and scheme information B to check whether a conversion rule for converting the information exists at step 607.

If the conversion rule exits, information is converted in accordance with the conversion rule, and the converted information is stored in the traceability database at step 608. In this case, the names of items are first converted into the names of corresponding traceability items (names of items of individual article information A). Specifically, the "individual article ID" is unchanged, the "class" is converted into the "level", the "inspection date" is converted into the "examination date", the "inspection result" is converted into the "examination result", and the "sale date" is converted into the "shipment date". The "name of the individual article" is deleted because it is not used in this example. Then, the record order of items of individual article information A of which the names have been changed is changed to suit traceability items. Because items corresponding to the "processing description" and the "processing date" of individual article information B do not exist, the names of these items are unchanged and added to traceability information.

Then, if the conversion rule does not exist, a process is carried out as follows at step 609. First, items (individual article identifier, name of individual article, class, inspection date, inspection result, processing description, processing date and sale date) included in individual article information B are extracted. Then, traceability center items recorded in advance are compared with the extracted items. If there are matching items, data of the extracted items are recorded in corresponding records. If all the extracted items are recorded in this way, the process is ended. If unrecorded items remain, traceability center items and remaining items (in this example, every extracted item because there is no matching item) are output to a display apparatus of the traceability center to provide display encouraging the user to associate traceability items with remaining items.

At step 610, data of remaining items are recorded in associated records in response to association by input from the user.

Associated results are recorded as the conversion rule. When traceability center items and remaining items are output to the display apparatus, traceability center items and remaining items may be associated with each other and output if they include partially matching terms.

Traceability information converted in this way at step 609 and 610 is recorded as follows. The traceability information is associated with previously recorded traceability information from the producer A and recorded. The traceability information is recorded with an "explicit statement" that the "individual article ID", the "level", the "examination date", the "examination result" and the "shipment date", which are the names of items, correspond to the scheme information A and the "processing description" and the "processing date" correspond to scheme information B (as shown in FIG. 15).

Then, at step 611, the wholesaler C sends individual article information C, tag identification information, identification information C for identifying the wholesaler C, and scheme information C indicating the information scheme in the wholesaler C to the traceability center.

In the traceability center, the information is received at step 612. At step 613, processes same as those of steps 606 to 611 are carried out for received information. However, there are some different processes, which will be described. Whether individual article information consisting of tow or more scheme information is stored is determined as a result of search same as that at step 606. If it is determined that the stored individual article information consists of two or more scheme information (i.e. scheme information A and B), conversion for suiting individual article information C to individual article information A, and conversion for suiting individual article information C to individual article information B are performed, respectively, and converted information is merged and registered.

The second method will now be described in which sent individual article information is compared with stored individual article information, and individual article information is converted to suit individual article information including all items of the individual article information. Scheme information B sent at step 605 is compared with stored scheme information A to determine whether one is included in the other. For example, which scheme information includes items of individual article information corresponding to the scheme information may be recorded. Furthermore, items may be included in scheme information, and compared to make a determination.

In the third method, Scheme information B sent at step 605 is compared with stored scheme information A to compare recorded individual article information (traceability information) and received individual article information, and individual article information having a smaller number of items is converted to suit individual article information having a larger number of items.

In the second and third methods, traceability information should be compared with individual article information each time when individual article information is received from each site. Thus, for saving the time and effort for the comparison, the process may be carried out as follows.

At step 601, the producer A sends distribution route information indicating the processor B, the wholesaler C, the retailer D and a distribution route, in addition to the information described above. In the traceability center, the above process is carried out, and the distribution route information and the above comparison result or conversion description are associated with each other and stored. When distribution route information is received from the producer A next time, individual article information to be converted is determined based on the stored description.

If further the second and third methods are used, many kinds of traceability information can be stored. In this case, stored traceability information may be converted by the method described above.

A process will now be described where no tag is used, or no tag identification information is recorded in the tag. At steps 601 and 602, the traceability center sends an individual article information identifier corresponding to individual article information A in response to the above reception. In the producer A, the received individual article information identifier is strung to the individual article to be managed. For example, if the tag is writable, the individual article information identifier is written in the tag. The individual article information identifier may be written in the individual article. In the processor B and subsequent sites, the individual article information identifier is sent to the traceability center. In this case, the individual article information identifier may be sent together with individual article information and the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An individual article management system for managing an individual article distributed through a plurality of sites with a form thereof changed at least one of said plurality of sites, comprising:
   information processing apparatuses installed at said plurality of sites; and
   a data center apparatus connected to each of said information processing apparatuses through a network, wherein:
   the data center apparatus is configured to:
   1) receive each of identification information having been appended to each of individual articles and each of index data including change information showing a process to each of the individual articles at the corresponding site for each of the individual articles, the identification information and the index data being transmitted from each of the information processing apparatus; and
   2) store each of the index data into a storing apparatus so as to be associated with each other on the basis of the identification information for identifying each of the individual articles, and wherein:
   each of the information processing apparatuses is configured to:
   1) receive search condition information including each of identification information; and
   2) determine a distribution route for each of the individual articles based on the search condition information having been received.

2. The individual article management system according to claim 1, wherein said identification information is a mono ID for identifying said individual article.

3. The individual article management system according to claim 2,
   wherein said data center apparatus receives, as said identification information, pre-process identification information added to said individual article at a site before the concerned site and post-process identification information added if said individual article is processed, as said process, to change the form thereof at the concerned site; and
   stores said pre-process identification information and said post-process identification information into said storing apparatus so as to be associated with said change information.

4. The individual article management system according to claim 3,
   wherein said post-process identification information is created from said pre-process identification information in accordance with a predetermined rule.

5. The individual article management system according to claim 4,
wherein said pre-process identification information is expressed by a numerical value of a predetermined number of digits, and in said predetermined rule, said post-process identification information is created by adding a numerical value of a predetermined number of digits to said pre-process identification information.

6. The individual article management system according to claim 1,
wherein said change information includes: at least one division to divide the individual article into a plurality of articles, change to change the form or name of the individual article, and integration to integrate a plurality of individual articles as said process.

7. The individual article management system according to claim 6,
wherein said individual article is a meat, and said change information includes dressing into the meat and packing of the meat as said process.

8. The individual article management system according to claim 6,
wherein said data center apparatus stores any one of the tags attached to the individual articles before the integration as being active into said storing apparatus, if said change information indicates said integration.

9. The individual article management system according to claim 1,
wherein said identification information is a process ID for identifying each process for said individual article.

10. An individual article management method, carried out by a computing system, for managing an individual article distributed through a plurality of sites with a form thereof changed at least one of said plurality of sites, the computing system including:
information processing apparatuses installed at said plurality of sites; and
a data center apparatus connected to each of said information processing apparatuses through a network;
the individual article management method comprising:
the data center apparatus effecting operations of:
1) receiving each of identification information having been appended to each of individual articles and each of index data including change information showing a process to each of the individual articles at the corresponding site for each of the individual articles, the identification information and the index data being transmitted from each of the information processing apparatus; and
2) storing each of the index data into a storing apparatus so as to be associated with each other on the basis of the identification information for identifying each of the individual articles, and
each of the information processing apparatuses effecting operations of:
1) receiving search condition information including each of identification information; and
2) determining a distribution route for each of the individual articles based on the search condition information having been received.

11. The individual article management method according to claim 10, wherein said identification information is a mono ID for identifying said individual article.

12. The individual article management method according to claim 11,
wherein said data center apparatus effecting operations of:
receiving, as said identification information, pre-process identification information added to said individual article at a site before the concerned site and post-process identification information added if said individual article is processed, as said process, to change the form thereof at the concerned site; and
storing said pre-process identification information and said post-process identification information into said storing apparatus so as to be associated with said change information.

13. The individual article management method according to claim 12,
wherein said post-process identification information is created from said pre-process identification information in accordance with a predetermined rule.

14. The individual article management method according to claim 13,
wherein said pre-process identification information is expressed by a numerical value of a predetermined number of digits, and in said predetermined rule, said post-process identification information is created by adding a numerical value of a predetermined number of digits to said pre-process identification information.

15. The individual article management method according to claim 10,
wherein said change information including: at least one division to divide the individual article into a plurality of articles, change to change the form or name of the individual article, and integration to integrate a plurality of individual articles as said process.

16. The individual article management method according to claim 15,
wherein said individual article is a meat, and said change information including dressing into the meat and packing of the meat as said process.

17. The individual article management method according to claim 15,
wherein said data center apparatus storing any one of the tags attached to the individual articles before the integration as being active into said storing apparatus, if said change information indicates said integration.

18. The individual article management method according to claim 10,
wherein said identification information is a process ID for identifying each process for said individual article.

* * * * *